United States Patent [19]
Powers

[11] Patent Number: 5,539,979
[45] Date of Patent: Jul. 30, 1996

[54] METHOD AND APPARATUS FOR REPAIRING THE REAR SEAL AREA ON THE CRANKSHAFT OF AN INTERNAL COMBUSTION ENGINE

[76] Inventor: James M. Powers, 928 Ashland Ct., Arlington, Tex. 76063

[21] Appl. No.: 314,634

[22] Filed: Sep. 29, 1994

[51] Int. Cl.⁶ .................................................. B23P 15/00
[52] U.S. Cl. ...................... 29/888.011; 29/280; 29/402.13
[58] Field of Search ........................ 29/888.011, 888.08, 29/402.02, 402.03, 402.13, 525, 235, 244, 280

[56] References Cited

U.S. PATENT DOCUMENTS

| | | | |
|---|---|---|---|
| 2,860,535 | 11/1958 | Fowler | 29/280 |
| 3,030,702 | 4/1962 | Fowler | 29/280 |
| 3,147,544 | 8/1964 | Connors, Sr. et al. | 29/888.011 |
| 4,027,365 | 6/1977 | Froeliger | 29/888.011 |

*Primary Examiner*—Irene Cuda
*Attorney, Agent, or Firm*—Charles W. McHugh

[57] ABSTRACT

A tool for repairing the rear oil seal for an engine including a plurality of tool inserts. A tool assembly is aligned with respect to the crankshaft and when aligned is used to apply a longitudinal installation force to the repair sleeve that has been designed to permanently cover a worn portion of the crankshaft.

19 Claims, 2 Drawing Sheets

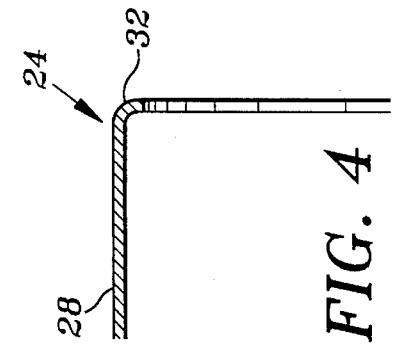
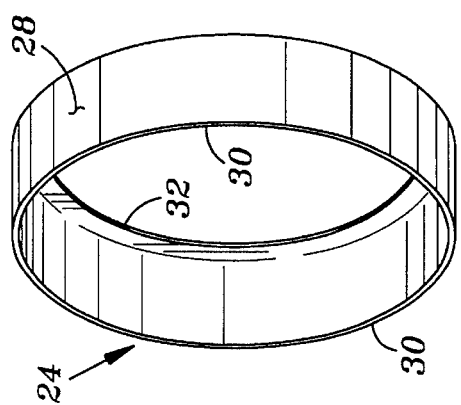
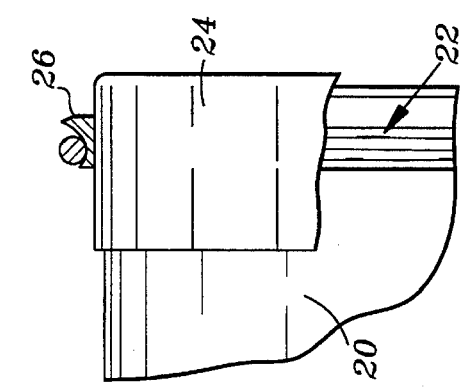
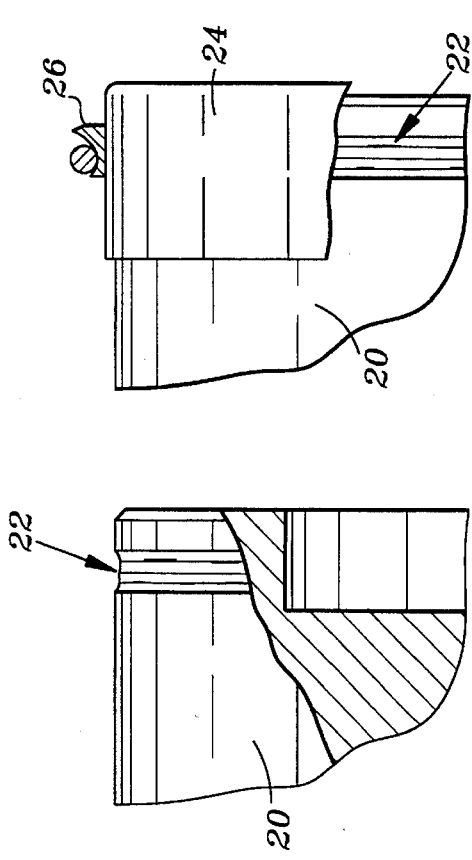
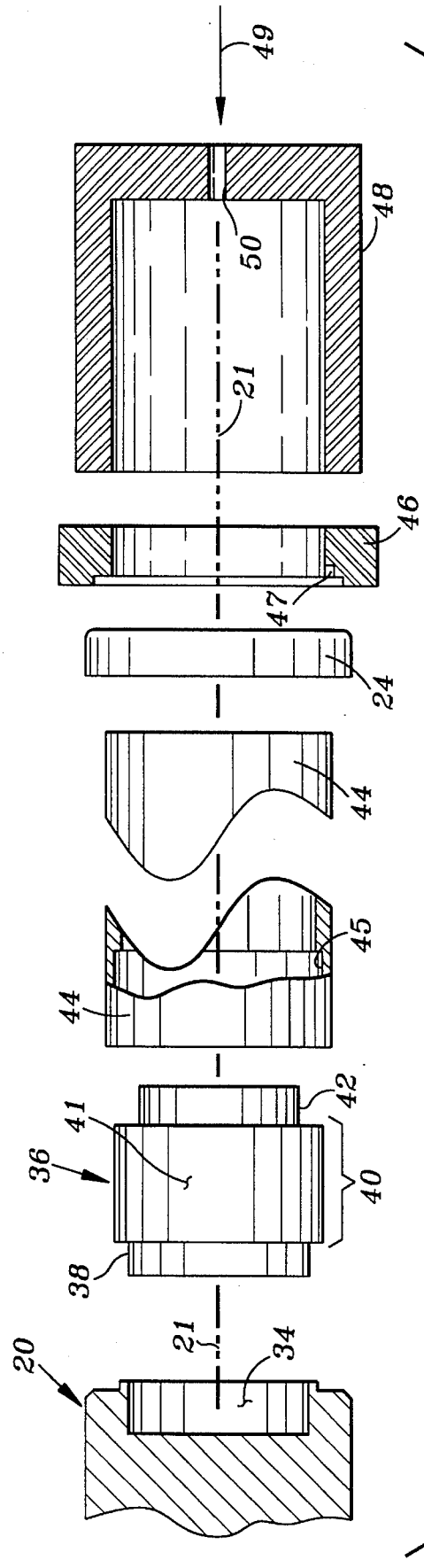

METHOD AND APPARATUS FOR REPAIRING THE REAR SEAL AREA ON THE CRANKSHAFT OF AN INTERNAL COMBUSTION ENGINE

FIELD OF THE INVENTION

This invention relates generally to the repair of a particular region on the crankshaft in an internal combustion engine, said region being circumscribed by the rear oil seal for the engine, and said region including a segment of a cylinder that is adjacent the rear main bearing of that engine. More specifically, the invention relates to a technique for repair that can be practiced after the engine has been removed from an automobile or other vehicle, or while the engine is still mounted in a vehicle. In particular, the invention relates to a tool assembly in which a given one of a plurality of tool inserts may be selected—and then used to correctly align the tool assembly with respect to a crankshaft. When so aligned, the assembly may be used to apply a longitudinal installation force to a thin repair sleeve that has been designed to permanently cover a worn portion of the crankshaft, to thereby render the worn portion of no consequence.

BACKGROUND OF THE INVENTION

There are many instances in which vehicle owners will take an automobile or other vehicle into a mechanic's shop, complaining about leakage of an oily liquid out of the vehicle's transmission. But when a mechanic disconnects and then lowers the transmission for a close inspection, it is sometimes discovered that a major part of the problem is not the transmission. Instead, the mechanic may determine that the sealing area at the rear of the engine's crankshaft has become so worn that the oil seal that wipes against the rotating crankshaft is no longer able to contain the engine's lubricating oil. The engine oil seeps past the "full circle" seal where the oil can contaminate and/or render ineffective the vehicle's clutch, etc; and, of course, when oil leaks out of an engine, it is not present to perform its intended function of lubricating the engine. Furthermore, leakage of engine oil is clearly not good for the environment; and examination of many drive-through lanes of banks and fast-food resturants will often reveal a build-up of oil that testified to the fact that many vehicles have an oil leakage problem. Financially, the repair of an engine or its crankshaft is usually more expensive than simply repairing a clutch or transmission, because so many things have to be removed from the vehicle, fixed or replaced, and then reinstalled. It would naturally be desirable if some way could be found to repair the cylindrical sealing surface on a crankshaft (to eliminate any groove) without resorting to the traditional multi-step repair technique. Such a repair technique typically involves removing the engine from a vehicle, removing the crankshaft from its engine, welding a bead of material around the worn area (to replenish the metal that has been worn away), and grinding the welded material down until a fresh, smooth cylindrical surface with a specified diameter has once again been obtained—a bearing surface against which a new rotary seal can be effective.

Another factor must be remembered if a mechanic decides to seriously go into the business of repairing crankshafts, namely, there is no universal standard that is observed by all engine manufacturers as to size and shape of their engines or their respective crankshafts. While it is conventional for all manufacturers to provide an axial recess in the rear end of the crankshaft, the size and shape of that recess will vary among manufacturers from, say, about ½ inch to about 2 inches for the diameter, and from, say, 0.125 inch to about 1.5 inches for the depth of the recess. If a mechanic expects to take on the repair of more than one type or brand of engine, it is conceivable that many very specialized tools might be required, some of which might be used only rarely. And it can become very expensive for a mechanic to keep in inventory one of every tool that is offered by distributors and tool jobbers, just in case the day comes along when a particular tool is needed. In fact, auto mechanics who are not prudent can rather quickly find themselves "long" on tools and "short" on cash. It would be beneficial, therefore, if there were a way to provide a tool assembly with a variety of replaceable inserts, each of which could be sized to fit a particular crankshaft, and the sum of which could be effective in the repair of essentially all of the myriad number of crankshafts that a modern mechanic can be expected to encounter.

While the repair of a worn crankshaft without welding it and then grinding the weld material down a smooth surface would be an advance in the art of engine repair, it would be much more desirable to be able to accomplish a repair job without removing an engine from an automobile or the like. Of course, dropping a transmission or moving it somewhat toward the rear can leave the rear end of an engine (and the rear end of the crank shaft) exposed; but being able to see a part that needs repair does not necessarily mean that there is always enough space for a mechanic to be able to do any work to fix a problem. It follows, therefore, that there has been a need for an apparatus and method of being able to quickly and easily repair the worn surfaces of crankshafts, and it is an object of this invention to meet this need.

The very limited space that is available in and under an automobile for accomplishing engine repairs is a major factor to be considered as background for this invention. But it is not the only factor. Indeed, if an engine had already been removed from a vehicle and were now in a shop or factory where it was undergoing inspection and repair, the availability of ample working space around the engine would not negate the advantageous use of the tools that are to be described herein. So if this disclosure seems to include unusual emphasis about the cramped working conditions around an engine that is still mounted in a vehicle, it should be remembered that those cramped working conditions have heretofore ruled out any alternative technique for accomplishing repairs. But the possibility of having plenty of working room around an engine should not distract from the fact that the tools that are to be described herein will eliminate the need to tear apart an engine in order to fix something that can be fixed in an alternative—and much quicker and cheaper—manner.

It may accurately be said that it is an object of this invention to accomplish crankshaft repairs while an engine is still mounted in a normal manner in the vehicle, as well as when the engine has been removed for rebuilding and/or more comfortable work.

One more object is to provide a tool assembly that has a "family" of inserts or adaptors, each of which is sized to mate with a selected one of the variety of crankshafts that are extant in today's marketplace—where crankshafts are made in many countries by many different manufacturers who have different philosophies about how mechanical things should be designed and built.

These and other objects will be apparent from a careful reading of the specification and the claims that follow, as well as reference to the several figures of the drawing that are provided herewith.

BRIEF DESCRIPTION OF THE SEVERAL FIGURES IN THE DRAWING

FIG. 1 is a fragmentary elevational view of the rear portion of a crankshaft, showing a portion of the cylindrical "seal area" that has become grooved and/or worn to the extent that a "full circle" flexible seal will no longer be effective to keep oil in the engine's crankcase;

FIG. 2 is a fragmentary elevational view similar to FIG. 1, and showing a portion of a repair sleeve that has been forced over the exposed rear end of a crankshaft, and also showing a seal in an operative position against the new sleeve;

FIG. 3 is a perspective view of an expemplary sleeve of the kind that is effective in covering the worn part of a seal area, thereby restoring said area to an essentially like-new operating condition;

FIG. 4 is an elevational view of an enlarged fragment of a repair sleeve, showing the swedged rear edge of a sleeve;

Figure 6:
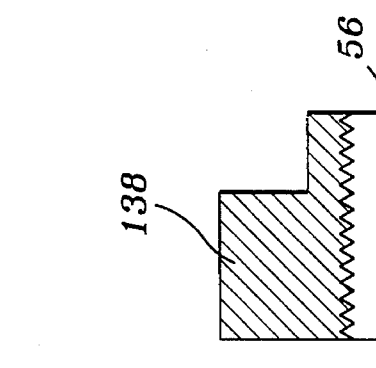
Figure 7:
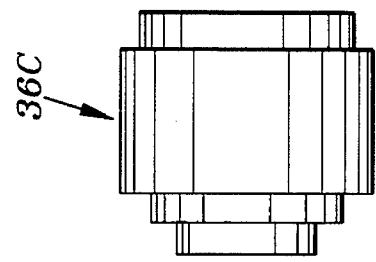
Figure 8:
Figure 10:
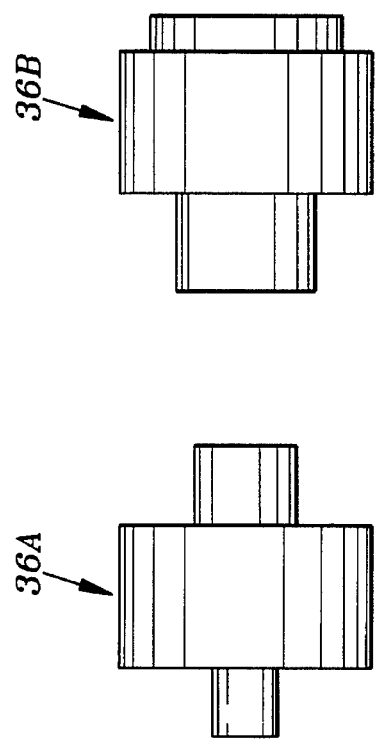
Figure 9:
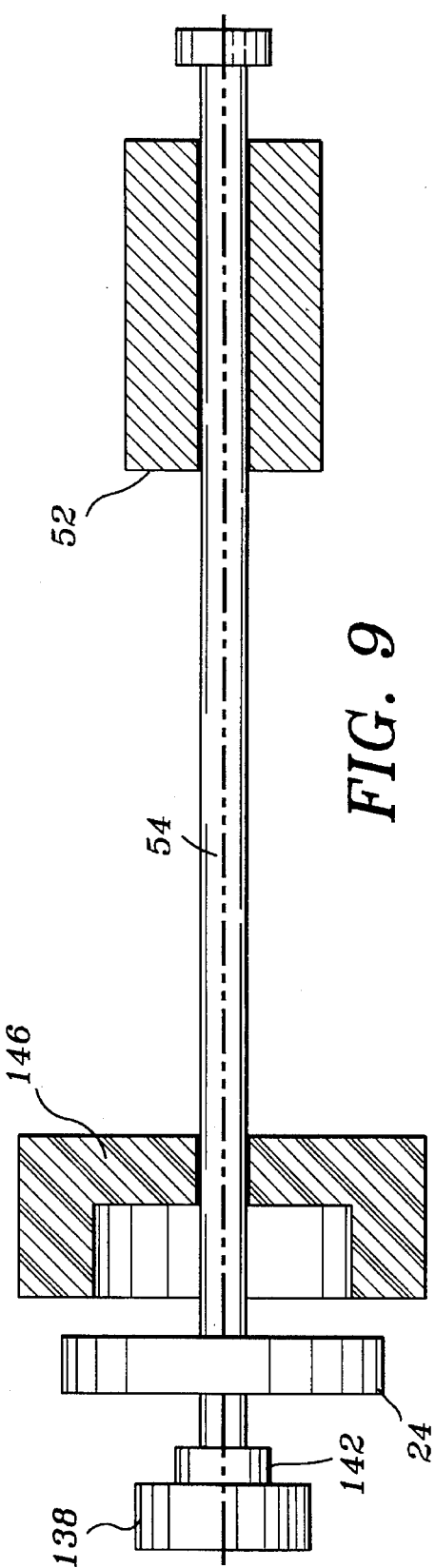

FIG. 5 is an elevational view, exploded and partially cross-sectioned, showing major parts of one embodiment of the invention, said parts being used to deliver a force to the back side of a repair sleeve, and the object of the force being to drive the sleeve onto the slightly larger sealing surface of the crankshaft in order to achieve such a tight fit that the sleeve will thereafter remain permanently fixed on the crankshaft;

FIG. 6 is an elevational view of an exemplary adaptor that is sized and shaped at one end to fit into the axial recess of a particular crankshaft, and having an external surface that operates as an alignment device;

FIG. 7 is an elevational showing of another insert that is functionally equivalent to the insert shown in FIG. 6 but which has been designed to mate with a different crankshaft;

FIG. 8 is an elevational showing of still another insert that is functionally equivalent to the insert shown in FIG. 6—but which has been designed to mate with a total of three different crankshafts;

FIG. 9 is an elevational view of an alternative embodiment of the invention, wherein a "slide hammer" construction is employed to deliver blows to the back of an element that functions in the same manner as the pusher ring shown in FIG. 5; and FIG. 10 is a cross-sectioned view of an exemplary adaptor of the style that is useful in correctly aligning a slide hammer (in accordance with FIG. 9) with the longitudinal axis of a crankshaft bearing, and showing complementary threads as one way of connecting the rod of the slide hammer to an adaptor.

BRIEF DESCRIPTION OF THE INVENTION

In brief, the invention comprises a tool assembly whose purpose is to foster the installation of a thin repair sleeve onto the exposed rear end of the crankshaft of an internal combustion engine. The repair sleeve is made primarily of carbon steel, with a very thin nickel plate—to foster some rigidity and to inhibit any surface deterioration (e.g., rusting) while the sleeve is sitting on a shelf awaiting its eventual installation. The combined thickness of the carbon steel and nickel plate is preferably about 0.0115 inch. The inner diameter of said sleeve is sized sufficiently smaller than the outer diameter of the crankshaft end (by at least 0.003 inch) as to dictate that the sleeve must stretch and thereby become wedged on the crankshaft as the sleeve is driven thereon with a "press fit." The outer surface of the sleeve is continuous and smooth (i.e., about 12 to 17 RMS), so that it simulates the original configuration of the crankshaft's outer end. In this regard, the sleeve should not be too smooth, or oil will not be able to seep under seal and lubricate the seal; but the sleeve cannot be too rough or it will act like sandpaper and destroy the seal. A typical sleeve will be about ¾ inch long, so there will be an adequate surface against which a one-piece ring-type flexible seal can rub (i.e., wipe) to effect a dependable oil seal and keep lubricating oil in the engine.

The tool assembly includes four principal elements, namely: 1) a structural member adapted to serve as a temporary spatial extension of the crankshaft; 2) an alignment device that is configured to rigidly hold the structural member so that it is aligned longitudinally with the exposed rear end of the crankshaft—in order that the structural member will be coaxial with the crankshaft; 3) a holding device whose function is to temporarily hold a repair sleeve in a properly aligned position adjacent the rear end of the crankshaft, in preparation for forcing the sleeve onto the, crankshaft; and 4) a driving element that is designed to move longitudinally with respect to the alignment device in response to longitudinally directed forces—and to force the repair sleeve onto the crankshaft.

A major consideration in the design of a preferred tool assembly is that it be capable of being used on as many different crankshafts as possible. To this end, there are provided a variety of adaptor elements, each of which is uniquely configured to mate with a given one of the variety of extant crankshafts that a mechanic is likely to encounter. A selected one of the adaptor elements may be combined with the assembly, so that one tool assembly may be used with essentially any one of a variety of different crankshafts. To optimize the number of possible tool combinations without unneccessarily increasing the number of parts, one embodiment of the invention has adaptor elements that are double ended, with each of its two ends being configured to mate with a different crankshaft. With this technique five double-ended adaptors, for example, will make it possible for ten different crankshafts to be repaired (at different times) by the same tool assembly. Sometimes adaptors can even be configured to mate with three different crankshafts, by having alignment devices of two different diameters near one end and a third alignment device at the opposite end.

A holding means is provided to contact the rear face of the repair sleeve and to temporarily hold it in place adjacent the rear of the crankshaft—before the repair sleeve is driven forward; the repair sleeve is held using friction and a longitudinally applied manual force. Because of the way it works, the holding means may be thought of as a pusher ring, in that a mechanic uses it to push against the back of a repair sleeve and hold the sleeve in place. Based on its appearance, the holding means may be considered to be a slice of a cylinder with a substantial bore in its middle—the bore being sized to provide a slip fit with a structural alignment device. Another way of evaluating the pusher ring is to think of it as being analogous to a beater plate, in that it is the intermediate piece whose front makes physical contact with—and pushes against—a repair sleeve when longitudinal blows are applied against its rear by a mechanic using a hammer or some other device. The pusher ring has a planar forward face that is adapted to bear against the rear "face" of a repair sleeve, i.e., that portion of the sleeve defined by the rear edge of the sleeve. The pusher ring's diameter is at least as large as, and preferably larger than, the diameter of the largest repair sleeve that is to be installed, so that there will be a full 360 degrees of contact between the pusher ring and the repair sleeve when longitudinal blows are applied to the rear of the pusher ring. A suitable diameter for this "donut-like" pusher ring is about 4 inches, and a suitable thickness is about 1.5 inches.

In one embodiment the driving element is a cup-shaped piece having a counterbore that is sized to slip over a structural member that is aligned with the crankshaft. The cup-shaped piece has a bottom that is sufficiently sturdy as to receive impact blows from a hammer or the like, and to transfer the forces resulting from such blows (as longitudinal driving forces) against the pusher plate and thence to the back of a repair sleeve. In one embodiment both the pusher ring and the cup-shaped piece are preferably made of ultra high molecular weight plastic such as polyethylene. Also, it is preferred that both of these two pieces be white, so that any grease or other contaminant on the pieces will be readily visible.

In another embodiment, an elongated steel rod is secured to a rigid alignment device so as to be coaxial therewith. The rod is preferably cylindrical and has a length of about one foot; it has a polished smooth surface that serves as a translation guide for a substantial mass that can slide back and forth on the rod in response to the application of manual forces. Those skilled in the art will no doubt recognize that the configuration that has just been descibed is sometimes known as a slide-hammer apparatus, especially when the rod has an enlarged head so that the mass is securely captured on the rod. A ring-like plastic structure (like the pusher ring described above) is also captured on the steel rod during installation, to receive concentrated blows from the longitudinally moving mass and transfer the force of those blows to the rear face of a repair sleeve.

DETAILED DESCRIPTION OF ONE EMBODIMENT OF THE INVENTION

Referring initially to FIG. 1, a fragment of the rear portion of a conventional crankshaft 20 is shown, including a circumferential groove 22 that has been worn into the peripheral surface where a one-piece or "full circle" flexible seal has rubbed against the rotating crankshaft. Such a groove 22, which may be as much as 0.050 inch deep and 0.125 inch wide, becomes the major cause for leakage of engine oil past the seal. Such grooves occur, according to some experts, when oil underneath a seal overheats and essentially carbonizes, thereby creating a hard material that can eventually wear away part of the adjacent sealing area on the crankshaft. In the past, a typical way of dealing with this kind of wear was to tear down the engine, remove the crankshaft, weld a bead of new material over the worn region at the rear of the crankshaft, grind down the new weld material until a smooth cylindrical surface of the correct diameter was realized, and then reinstall the crankshaft and the engine. The fact that this work could be done did not necessarily mean that it was a good idea, even if simple economics did not play an immediate part in the decision to repair or replace an engine. Grinding down the seal area can remove metal in a part of the drive train that receives mounting bolts that typically hold a flywheel or flex plate in an internal combustion engine, and there is a possibilty of warping or weakening the rear end of the crankshaft to the extent that correctly torquing a mounting bolt can deform a portion of the crankshaft. It follows, therefore, that it would be advantageous to able to cure a groove problem without having to disassemble an engine or subject it to a potentially risky grinding job.

Turning additionally to FIG. 2, a repair sleeve 24 is shown in an installed position on a crankshaft 20, with the groove and the thickness of the sleeve being slightly exaggerated in the drawing to enhance their visibility. It will be seen that the groove 22 still exists, but it is no longer of any consequence because it is covered and does not constitute a leakage threat—as far as passing engine oil is concerned. The replacement seal 26, which may be of a standard size for the particular engine that is being repaired, will now make contact with the exterior surface of new sleeve 24 instead of a worn portion of the underlying crankshaft 20. For a sleeve thickness of 0.0115 inch, the total additional thickness that a seal 26 will "feel" or "see" is about 0.023 inch, which is well within the range of dimensions that a conventional one-piece seal (with a circumferential coil spring) is designed to accommodate. Hence, there is no requirement that a specially sized seal be built to use with this invention as a complement to the repair sleeve 24.

For clarification of exactly what a repair sleeve looks like, FIG. 3 shows a perspective view of an exemplary repair sleeve 24, and FIG. 4 shows a fragment of such a sleeve in cross-section. These two figures show that a repair sleeve 24 has a generally cylindrical outer surface 28, a forward face (defined by the circular edge 30), and a rear face (defined by the edge 32). The rear edge 32 is preferably swedged (i.e., upset inwardly) to provide a geometrically strengthened region against which longitudinal driving forces may be applied without running the risk of bending the sleeve 24 or otherwise distorting its circular shape. The inwardly swedged edge 32 also advantageously serves as a mechanical stop, which will eventually bear against the chamfered rear corner of a crankshaft—so that a sleeve 24 cannot be accidentally forced too far onto the rear end of a crankshaft 20. A preferred sleeve 24 has a thickness of about 0.0115 inch, and it is mostly carbon steel with a thin outer coat of electroplated nickel. Such a composite material will have thermal characteristics that are similar to the crankshaft to which the sleeve is to be attached, and it can be stretched enough to ensure a locked-on fit when it is forced onto the crankshaft. To ensure this tight fit, a repair sleeve should have a diameter that is at least 0.003 inch smaller than the diameter of the rear end of the crankshaft. Such a dimensional relationship should provide what may also be described as a "medium force press fit."

Referring next to FIG. 5, a major principle of the invention is to establish a stable and accurate placement of a repair sleeve 24 adjacent the rear end of a crankshaft 20, so that driving forces applied to the rear of the sleeve will cause it to be forced onto the crankshaft. The rear end of the crankshaft 20 has been partially cut away to reveal a central recess 34 that is present on all modern crankshafts. Although all modern crankshafts have such a recess, they are not of uniform depth or diameter, and they vary from manufacturer to manufacturer and from engine to engine. To mate with each of a variety of crankshafts, a unique tool could be fabricated for each crankshaft that is to be repaired; but this could become unnecessarily expensive. As an alternative, it is preferred that an essentially universal tool assembly be fabricated, wherein a plurality of adaptors 36 form those parts of an alignment means that require various sizes and shapes. A typical adaptor 36 shown in FIG. 5 constitutes a rigid body of machined and polished steel that has a forward end 38 whose size and shape permits a very close fit (i.e., a "location" or "transition" fit) into recess 34. When adaptor 36 has been slipped into recess 34, the adaptor will form a temporary structural extension of the crankshaft 20, and cylindrical surface 41 will be coaxial with the crankshaft's axis 21. And in accordance with standard principles of geometry, everything else that is positioned so as to be coaxial with the adaptor 36 will also be coaxial with the crankshaft 20.

The adaptor 36 is shown in FIG. 5 as a unitary body, but it actually serves a double function. It may be useful, therefore, to think of the adaptor 36 as being two separate and distinct items that have been combined during manufacturing for economy and convenience in handling, etc. First, the forward end 38 mates with the recess 34 and forms a very close and hence accurately aligned "male" extension of the crankshaft; therefore, the size and shape of the forward end will be dictated solely by the recess that it is intended to fit. The middle part of the adaptor 36, namely, the region identified in the drawing by the bracket 40, is not a function of any crankshaft; instead, region 40 may be thought of as a dependable alignment device—in that it is a rigid structural member that is accurately aligned with (and coaxial with respect to) the longitudinal axis 21 of the crankshaft. When given a predetermined and carefully established diameter, this region 40 and its cylindrical surface 41 may serve as a reference for locating other parts of the tool assembly, and it becomes the basis for aligning certain parts that are still to be described. The rear end 42 of this particular adaptor 36 serves no purpose in this arrangement of parts. But it will be seen that end 42 has been illustrated with a diameter that is different from the forward end 38; and to expand the utility of each adaptor 36, their respective rear ends 42 are each given a configuration that will mate with a different crankshaft. By making the adaptors double ended, as shown, each adaptor will be able to function as an alignment device for two crankshafts.

With continued reference to FIG. 5, and moving to the right in the exploded view of several elements, there is shown a portion of a rigid sleeve 44. The interior of the sleeve is counterbored at its forward end to provide an innner surface 45 whose diameter (commonly abbreviated ID) is sized to provide a very close fit, e.g., a location fit, with the exterior of adaptor region 40. While it has already been established that the periphery of region 40 constitutes a known surface that could alone function as an alignment device, the adaptor 36 is preferably made of high quality steel and may be somewhat expensive, because of its base material and the labor that is put into giving it an accurate and polished external surface. To make an adaptor that is long enough to permit it to do everything that may eventually be wanted of it could cause it to be an unnecessarily heavy and expensive part. Instead, the counterbored portion 45 of rigid support sleeve 44 is designed to provide a close-tolerance slip fit over the cylindrical surface 41 to form a light-weight spatial extension of adaptor 36. A suitable sleeve 44 made of hardened steel will have a length of about four inches and a wall thickness of about ⅛ inch, and will weigh about 13 ounces. The outer diameter (abbreviated OD) of support sleeve 44 is given a predetermined value (e.g., 1.875 inches) so that other parts of the assembly can be assured of a desired fit with the exterior of the sleeve.

An exemplary repair sleeve 24 is shown in FIG. 5 where it would be held by manual pressure applied through a pusher ring 46 during the installation process. Of course, it will be remembered that the ID of repair sleeve 24 is only slightly smaller than the OD of the crankshaft's rear end. So repair sleeve 24 would not remain in the position shown if it were not being supported in some manner. But the weight of a typical repair sleeve (about 0.2 ounce) is so small that holding it in place is easy, by simply applying a modest forward force with the pusher ring 44 in the direction of the crankshaft. The inner diameter of pusher ring 46 is accurately sized to provide a close-tolerance slip fit (i.e., a clearance of only a few thousandths of an inch) with respect to the exterior of extension sleeve 44, so that the pusher ring can be easily slipped along the sleeve when impact forces are applied thereto. A small recess 47 is shown in the forward face of pusher ring 46, to provide clearance for a locating knob that will be found on certain crankshafts.

Shown next (to the right, and designed to contact the back of the pusher ring 46) is a cup-shaped impact member 48 whose ID is established to provide a loose fit with the OD of support sleeve 44. A vent hole 50 is provided in the bottom of the member 48 to allow air to escape as the member 48 is slipped over sleeve 44. Like the pusher ring 46, the impact member 48 is made of a high-strength material that readily tolerates impact blows; a preferred material is ultra high molecular weight polyethylene. The function of member 48 is to absorb concentrated blows (represented by arrow 49) from a hammer or the like, and to distribute the force of those blows over a wide frontal area, so that the pusher ring will in turn be able to exert wide-area longitudinal forces against the rear of the repair sleeve 24. Those skilled in the art might recognize that the pusher ring 46 and the cup-shaped impact member 48 could be made as a unitary element. But it is sometimes easier to maneuver a tool in the cramped space around certain engines when the driving tool is a relatively short piece instead of a long piece. Also, it is preferred to foster cleanliness in the practice of this invention; so to make these two pieces as separable items is believed to be advantageous, in order that they can be more readily separated and cleaned. Furthermore, if the front face of the pusher ring should ever become damaged, so that it is no longer smooth and perpendicular to the longitudinal axis of the crankshaft, it can be replaced as a separate item. Also, if the cup-shaped member 48 should ever fracture or otherwise become unserviceable, it too can be replaced as a single item. Additionally, building the pusher ring 46 and the impact member 48 as separate items would permit the pusher ring to be reversed so as to present a different face for bearing against the rear of a repair sleeve 24. If the crankshaft is recessed into the engine, a special configuration could be machined into the pusher ring 46, to compensate for that recess.

On the subject of cleanliness, it must be remembered that an advantage of the invention described herein is that crankshaft repairs can be performed while an engine and its crankshaft are still mounted in a vehicle—as long as there is adequate clearance room for a mechanic to swing a hammer at the rear of the cup 48. And it should also be noted that the bottom part of an engine that has long been installed in an automobile or the like will perhaps have an abundance of external contaminants, including dirt, oil, grease, road tar, etc. To avoid letting dirt or a clump of hard grease interfere with the smooth operation of the various tight-fitting parts that have been described, it is preferred that that the tool pieces 46, 48 be a "white" condition, either naturally or by addition of a pigment that is added during manufacture, so that any possible contaminant will more readily be visible to a mechanic—and quickly eliminated.

FIGS. 6, 7 and 8 show examples of other adaptors 36A and 36B and 38C, each of which may be alternatively used in the tool assembly that has just been described, to permit use of the tool assembly with a variety of differently sized crankshafts. FIG. 8 shows an embodiment that be mated with a selected one of three different crankshafts, by virtue of the three different exposed structural features.

DETAILED DESCRIPTION OF A SECOND EMBODIMENT OF THE INVENTION

Turning next to FIGS. 9 and 10, another embodiment of the invention is shown, in elevation, with one part sectioned. The principle of this second embodiment is the same as that of the first, namely, to provide a way of temporarily holding a repair sleeve adjacent, and in correct alignment with, the rear end of a crankshaft—until sufficient longitudinal blows can be applied to the rear face of the repair sleeve to drive it onto the crankshaft. And as before, the object is to cover a worn area of the crankshaft, to thereby render the area "like new" and able to foster a desired sealing relationship with a standard one-piece oil seal. However, instead of providing a cup-shaped impact member against which hammer blows are directed, the embodiment of FIG. 9 has the characteristics of a slide hammer, in that it has a heavy mass 52 (e.g., about 1.6 pounds) that can be readily slipped along a steel rod 54 to deliver blows to the back of member 146. As with the earlier described embodiment, these blows will be passed through the member 146 and they will operate to force a repair sleeve onto the exposed end of the slightly larger crankshaft. But it is not enough to simply provide a slide hammer (or any other driving mechanism) to push on the back of a repair sleeve; that slide hammer must be correctly aligned with the crankshaft before the first gentle blow is ever struck. In this embodiment, alignment is achieved by providing a device 138 that is functionally equivalent to the alignment device 38 that was earlier described. However, in this case the alignment device 138 is secured to a rod 54 in such a way that the rod and the device are coaxial and rigidly connected. This is preferably done by providing a longitudinally threaded bore 56 (about ¾ inch in diameter) in the center of the alignment device 138, and providing complementary threads at the forward end of rod 54. Using this technique, a single rod 54 may be selectively connected to any one of a plurality of button-like devices 138, depending on what may be necessary to fit a particular crankshaft. Of course, if a repair facility is concerned only with repairing a single type of engine, then the correctly sized alignment device could be secured to the rod in a manner that does not necessarily foster easy removal and/or substitution.

By making the threaded bore 56 long enough to pass completely through the alignment device 138, the device may be considered to be reversible, so that either end of it may be caused to mate with an appropriately sized crankshaft. And by making the diameter of one end different from the other end, two alignment devices 138, 142 are obtained and two differently sized crankshafts can be serviced with a single body.

Having described a manner of repairing a crankshaft without removing an engine from a vehicle, perhaps it should also be mentioned that the process of repairing cankshafts disclosed herein could also be advantageously accomplished while an engine is sitting on a stand in the middle of some repair shop, or on an assembly line in a re-manufacturing plant. And, if there is plenty of elbow room around a mechanic, then so much the better. Therefore, the concept disclosed herein should not be categorized as being limited to the environment of an engine that is still installed in a vehicle. Also, it should be understood that the two embodiments described herein are believed to be of essentially equal merit, and it would be difficult to describe one as being preferred over the other. Because both embodiments achieve the same results in a similar manner, it basically becomes a matter of personal preference-and available working space—as to which one is chosen to solve a particular problem. However, the embodiment that uses a slide hammer to provide longitudinal blows will have fewer parts and fewer dimensions that need to be maintained within assigned tolerances; also, the slide-hammer embodiment will normally be faster to use. Based on these criteria, the slide-hammer embodiment may be considered to be the "preferred embodiment" for patent purposes. But when the working space around an engine is limited, the embodiment of FIG. 5 may be the only embodiment that is compact enough to do the job. The combined length of the pusher ring 46 and the impact member 48 will typically be less than six inches, and the length of a typical rod 54 will be about one foot. So when working space is at a premium, the first embodiment may be preferred over the slide-hammer embodiment.

It should also be noted that the use of a manual impact device to apply longitudinal forces has been described herein in both embodiments as the preferred technique for driving a repair sleeve onto a crankshaft. On the other hand, if enough discipline were to be exercised by a mechanic in going slowly in applying hydraulic, pneumatic, or mechanical pressure to a pusher plate, then it would be reasonable for a powered embodiment of the invention to be fabricated. As it turns out, the application of manually applied hammer blows by a mechanic has a built-in slowness that helps ensure that a repair sleeve is always being correctly aligned with a crankshaft as the sleeve is slowly being driven forward. In effect, the use of solely manual driving forces in the installation process is an advantage—not a disadvantage, because a mechanic can always pause and verify that the repair sleeve is going onto the crankshaft correctly. To provide the speed and power of a mechanized system might be faster, but it might also contribute to the waste of repair sleeves that were not properly aligned before they were forced forwardly at less than an optimum angle. Incorrectly aligned repair sleeves could perhaps be bent and ruined as a result of the application of too much force at the wrong time. In one sense, this situation is analogous to suggesting that a sculpturer could cut granite much faster if only he or she would just use an air compressor and a jack hammer; but the finished product probably would not have the polished appearance of a work produced manually with a much slower hammer and chisel.

While only two principal embodiments of the invention have been disclosed herein in great detail, those skilled in the art will no doubt recognize that variations and changes could be made without departing from the spirit of the invention. For example, no mention has been made herein of the use of heat to expand the repair sleeve immediately before it is placed in position for installation on the crankshaft. And while a hot (and expanded) repair sleeve might be slightly easier to push onto the exposed rear end of a crankshaft, it is believed that the risk of a burn injury to any mechanic who is handling hot parts is not worth the benefit of reducing any deliberate interference (at room temperature) between a crankshaft and a repair sleeve. So the disclosure herein has focused on an optimum manner of handling and installing parts at room temperature; but the addition of heat should not be deemed to be completely outside the scope of this invention. Therefore, it should be understood that the scope of the invention should be measured by the claims that are appended hereto, rather than any specific details that have been shown or described.

What is claimed is:

1. The method of repairing a cylindrical sealing surface at the rear end of a crankshaft, said crankshaft having an operational location in an internal combustion engine, and the sealing surface that is worn and in need of repair being co-axial with a longitudinal axis of the crankshaft, comprising the steps of:

a) manually placing a thin metallic repair sleeve in contact with the rear end of the crankshaft and in co-axial alignment with the sealing surface that is in need of repair, and said repair sleeve having a nominal diameter that is less than the diameter of the rear end of the crankshaft;

b) placing a pusher ring behind and in contact with the thin repair sleeve, said pusher ring having a rear face and a generally planar front face; and c) imparting longitudinal blows to the rear face of the pusher ring to force the thin repair sleeve forward and over the worn sealing surface while the crankshaft remains in the internal combustion engine, whereby the repair sleeve will be stretched as it is forced onto the rear end of the crankshaft.

2. The method of repairing a cylindrical sealing surface at the rear end of a crankshaft as claimed in claim 1 wherein blows are imparted to the rear of the pusher ring with an apparatus having the configuration and operational characteristics of a slide hammer.

3. An apparatus for use in repairing a cylindrical sealing surface at the rear end of a crankshaft, said crankshaft typically being installed in an internal combustion engine, and the sealing surface that is to be repaired being co-axial with a longitudinal axis of the crankshaft, and the repair of the crankshaft being accomplished by forcing a thin metallic repair sleeve forwardly over the worn sealing surface in such a way that the exterior surface of the repair sleeve will come to rest over the worn surface of the crankshaft and thereby provide a fresh surface against which sealing may subsequently be accomplished with a one-piece flexible seal, and the repair sleeve having an open front face and an open rear face and a nominal diameter that is slightly less than the diameter of the rear end of the crankshaft, comprising:

a) a structural member adapted to serve as a temporary geometric extension of the crankshaft, and said structural member having a longitudinal axis;

b) an alignment means for temporarily positioning the structural member at the rear end of an engine's crankshaft in such a way that the structural member is aligned with the rear end of the crankshaft and is coaxial with the crankshaft;

c) holding means for manually holding a cylindrical repair sleeve coaxial with the rear end of the crankshaft and in contact with the rearmost part of the crankshaft, said holding means being coaxial with said alignment means; and d) driving means for applying impact forces to the rear face of the repair sleeve while said sleeve is being manually held in contact with the rear end of the crankshaft, said impact forces being directed in a generally forward direction and being oriented so as to be at least generally parallel to the longitudinal axis of the structural member, and the cummulative effect of said impact forces being sufficient to stretch the repair sleeve and force it onto the rear end of the crankshaft for permanent retention on the crankshaft.

4. The apparatus as claimed in claim 3 wherein said alignment means constitutes a rigid body having a generally cylindrical shape, said rigid body having a forward portion whose size and shape fosters a location fit into a cylindrical recess on the exposed rear end of a crankshaft, and said structural member being configured for static support by the forward portion of the rigid body, and said structural member having a smooth external surface that provides a reference surface onto which a support sleeve can be installed with a location fit.

5. The apparatus as claimed in claim 3 wherein said alignment means constitutes a rigid body having a forward portion whose size and shape fosters a location fit into a cylindrical recess on the exposed rear end of a crankshaft, and said structural member and the forward portion of the rigid body being rigidly connected to one another through engagement of complementary threads, and said structural member having a smooth external surface that provides a guiding support for the driving means.

6. The apparatus as claimed in claim 3 wherein the holding means includes a support sleeve having an inner diameter that is sized to provide a slip fit with the structural element, and said support sleeve having a smooth exterior surface upon which may be slipped elements having a bore of given size, and the support sleeve having a longitudinal axis and a length that is sufficient to provide guidance and support for at least a portion of the driving means.

7. The apparatus as claimed in claim 6 wherein said holding means includes a pusher ring having a front and a rear face and a cylindrical bore that is sized to provide a slip fit with the exterior surface of the support sleeve, and wherein said driving means includes a longitudinally movable impact member for transferring longitudinal forces to the rear face of the pusher ring, whereby a repair sleeve may be temporarily held in a centered position in front of the pusher ring and then forced over the worn part of a crankshaft sealing surface when the pusher ring is subjected to longitudinal forces on its rear face.

8. The apparatus as claimed in claim 7 wherein the longitudinally movable impact member constitutes a cup-shaped member having a central bore whose diameter is sized to provide a slip fit with the support sleeve.

9. The apparatus as claimed in claim 8 wherein the cup-shaped member has an external diameter of about 3 inches, a total length of about 3.75 inches, and an internal bore with a depth of about 3.25 inches.

10. The apparatus as claimed in claim 7 wherein the longitudinally movable impact member is made of ultra high molecular weight polyethylene.

11. The apparatus as claimed in claim 7 wherein both the pusher ring and the longitudinally movable impact member are made of ultra high molecular weight polyethylene in a white condition.

12. The appartatus as claimed in claim 3 wherein the alignment means includes a body that is generally cylindrical and is double ended, and the orientation of the body is reversible so that each of the body's two ends can be oriented to face forwardly toward the exposed end of a crankshaft, such that either one of the member's two ends may be inserted into the rear end of an appropriately sized crankshaft.

13. The apparatus as claimed in claim 3 wherein the alignment means includes a set of functionally equivalent alignment devices, each of which alignment devices has a forward portion that is sized and shaped for snugly fitting into the rear end of one of a variety of differently sized crankshafts.

14. The apparatus as claimed in claim 3 wherein the driving means includes a captured mass that is linearly slidable with respect to the alignment means for a distance of several inches, and said mass has a weight of at least 1.5 pounds.

15. An apparatus for use in repairing a cylindrical sealing surface at the rear end of a crankshaft, said crankshaft typically having an operational location in an internal combustion engine, and the sealing surface that is worn and in need of repair being co-axial with a longitudinal axis of the crankshaft, and the repair of the crankshaft being accomplished by forcing a thin metallic repair sleeve over the worn sealing surface in such a way that the exterior surface of the thin sleeve will overlie the worn surface and thereby provide a fresh sealing surface, and the repair sleeve having an open front and an open back and having a nominal diameter that is slightly less than the diameter of the rear end of the crankshaft, comprising:

a. means for positioning a force-transmitting pusher ring immediately behind a thin metallic repair sleeve in such a way that the pusher ring is exactly parallel to the rear end of the crankshaft; and b. means for imparting longitudinal forces to the back of the pusher ring while the pusher ring is aligned behind the thin repair sleeve, whereby the thin repair sleeve may be driven over the crankshaft sealing surface that is need of repair without the necessity for removing the crankshaft from the internal combustion engine in which it is mounted, and whereby the thin sleeve can be made to overlie the worn surface so as to provide a fresh sealing surface.

16. The apparatus as claimed in claim 15 wherein said means for imparting longitudinal forces to the back of the pusher ring includes a cup-shaped member having a lip and an inner diameter, and said lip being sized and configured to push against the back of the pusher ring, and further including an alignment device to hold the cup-shaped device so that it is coaxial with the crankshaft while longitudinal forces are being applied to the pusher ring's back.

17. The apparatus as claimed in claim 15 wherein said means for imparting longitudinal forces to the back of the pusher ring includes a slide-hammer device in which a heavy mass is captured for sliding movement along a straight rod, and the straight rod being adapted for physically alignment with the crankshaft so as to be coaxial therewith.

18. The apparatus as claimed in claim 15 and further including means for supporting the pusher ring in exact axial alignment with the crankshaft while longitudinal forces are being applied against the back of the pusher ring.

19. The apparatus as claimed in claim 18 wherein said means for supporting the pusher ring in exact axial alignment with the crankshaft includes a structure having a longitudinal body, and further including a plurality of structural inserts, each of which inserts may be selectively combined with the longitudinal body to fit the size and shape of a particular crankshaft.

* * * * *